US010250873B2

(12) United States Patent
Sharma et al.

(10) Patent No.: US 10,250,873 B2
(45) Date of Patent: Apr. 2, 2019

(54) AUTOMATIC DEVICE TESTING

(71) Applicant: Verizon Patent and Licensing Inc., Basking Ridge, NJ (US)

(72) Inventors: Nityanand Sharma, Tampa, FL (US); Fijula Kuniyil, Irving, TX (US); Jivko Varlakov, Homosassa, FL (US); Brian E. Bond, Fairmont, WV (US); Anush Nair, Dallas, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 15/654,220

(22) Filed: Jul. 19, 2017

(65) Prior Publication Data

US 2019/0028699 A1    Jan. 24, 2019

(51) Int. Cl.
*G06F 11/27* (2006.01)
*H04H 60/32* (2008.01)
*H04N 17/00* (2006.01)
*H04N 17/04* (2006.01)
*H04N 21/4425* (2011.01)

(52) U.S. Cl.
CPC .......... *H04N 17/045* (2013.01); *G06F 11/27* (2013.01); *H04H 60/32* (2013.01); *H04N 17/004* (2013.01); *H04N 21/4425* (2013.01)

(58) Field of Classification Search
CPC .. H04N 17/045; H04N 17/00; H04N 21/4516; H04N 21/24; H04N 21/4424; H04N 21/4425; H04N 21/442; H04N 21/26216; H04N 21/42222; H04N 21/44227; H04N 21/4432; H04N 21/4524; H04N 21/6405; H04N 21/6408; H04L 43/50; H04L 65/4076; H04L 1/205; G06F 11/27; G06F 11/3409; G06F 11/3466; G06F 11/3672; H04W 24/00
See application file for complete search history.

(56) References Cited

U.S. PATENT DOCUMENTS

| | | | | |
|---|---|---|---|---|
| 2004/0242235 A1* | 12/2004 | Witana | ................... | H04W 28/16 455/452.2 |
| 2009/0328098 A1* | 12/2009 | Beyabani | ............ | G06F 11/0709 725/39 |
| 2011/0286345 A1* | 11/2011 | Goue | ...................... | H04L 1/203 370/252 |
| 2014/0130111 A1* | 5/2014 | Nulty | ................... | H04N 17/004 725/107 |
| 2014/0300757 A1* | 10/2014 | Dhaliwal | ............. | H04N 17/004 348/192 |
| 2014/0329471 A1* | 11/2014 | Bartlett | .................. | H04L 43/08 455/67.14 |

* cited by examiner

*Primary Examiner* — Hai V Tran (57) ABSTRACT

A device can receive an indication to perform a test of a capability of the device to receive data. The data can have a threshold data rate. The device can perform an action to cause the device to receive the data from a source of the data at the threshold data rate. The device can monitor a set of metrics related to the data or a performance of the device. The device can perform an analysis of the set of metrics after monitoring the set of metrics. The device can identify a source of an error based on a result of performing the analysis of the set of metrics. The source of the error can be related to the data or the performance of the device. The device can perform another action related to fixing the source of the error.

20 Claims, 10 Drawing Sheets

AUTOMATIC DEVICE TESTING

BACKGROUND

Device testing can be performed to assure the quality of electronic devices. For example, device testing can be used to identify a fault in an operation of a device. Device testing can include verification and validation of hardware devices and software applications. Further, device testing can include monitoring, troubleshooting, and/or the like.

DETAILED DESCRIPTION OF PREFERRED EMBODIMENTS

The following detailed description of example implementations refers to the accompanying drawings. The same reference numbers in different drawings can identify the same or similar elements.

A technician can install a device (e.g., a set-top box) at a premises. In some cases, the installation can occur during a period of time when demand for bandwidth and/or other network resources is low and/or when interference from other devices is low (e.g., demand and/or interference that does not satisfy a threshold). For example, the technician can install the device in a home during working hours when neighbors and/or people living in the home are at work or school. This can prevent the technician from accurately evaluating a performance of the device during periods of high demand for network resources (e.g., demand that satisfies a threshold) and/or in scenarios similar to normal operating conditions of the device (e.g., evening hours, weekend hours, etc.). As a result, the performance of the device can be negatively impacted during normal operating conditions, a technician can be requested to return to the premises to fix the device at a later time, and/or the like.

Some implementations, described herein, provide a device that is capable of performing a self-test by tuning to a channel to cause the device to use a threshold amount of network resources. In this way, the device can self-test to determine a performance of the device in scenarios that are similar to times of high demand for network resources and/or that are similar to normal operating conditions, regardless of whether the device is being tested during a time of low demand for network resources. This improves an installation and/or a test of the device by causing the device to be subjected to conditions that are similar to normal operating conditions or that include a high demand for network resources. In addition, this conserves processing resources of the device that would otherwise be consumed due to a degradation in performance of the device during times of high demand for network resources. Further, this increases an efficiency of installing and/or configuring the device by reducing or eliminating a need for a technician to return to a premises to fix the device due to operational errors caused by high demand for network resources, by ensuring that the device can operate properly under normal operating conditions and/or during times of high demand for network resources at the time of installation, and/or the like.

FIGS. 1A-1D are diagrams of an overview of an example implementation 100 described herein. For illustration, example implementation 100 includes a user device, a set-top box, and a server device. The set-top box can be located at a customer premises and the user device can be associated with an owner of the premises, a technician installing and/or troubleshooting the set-top box, and/or the like.

Figure 1A:
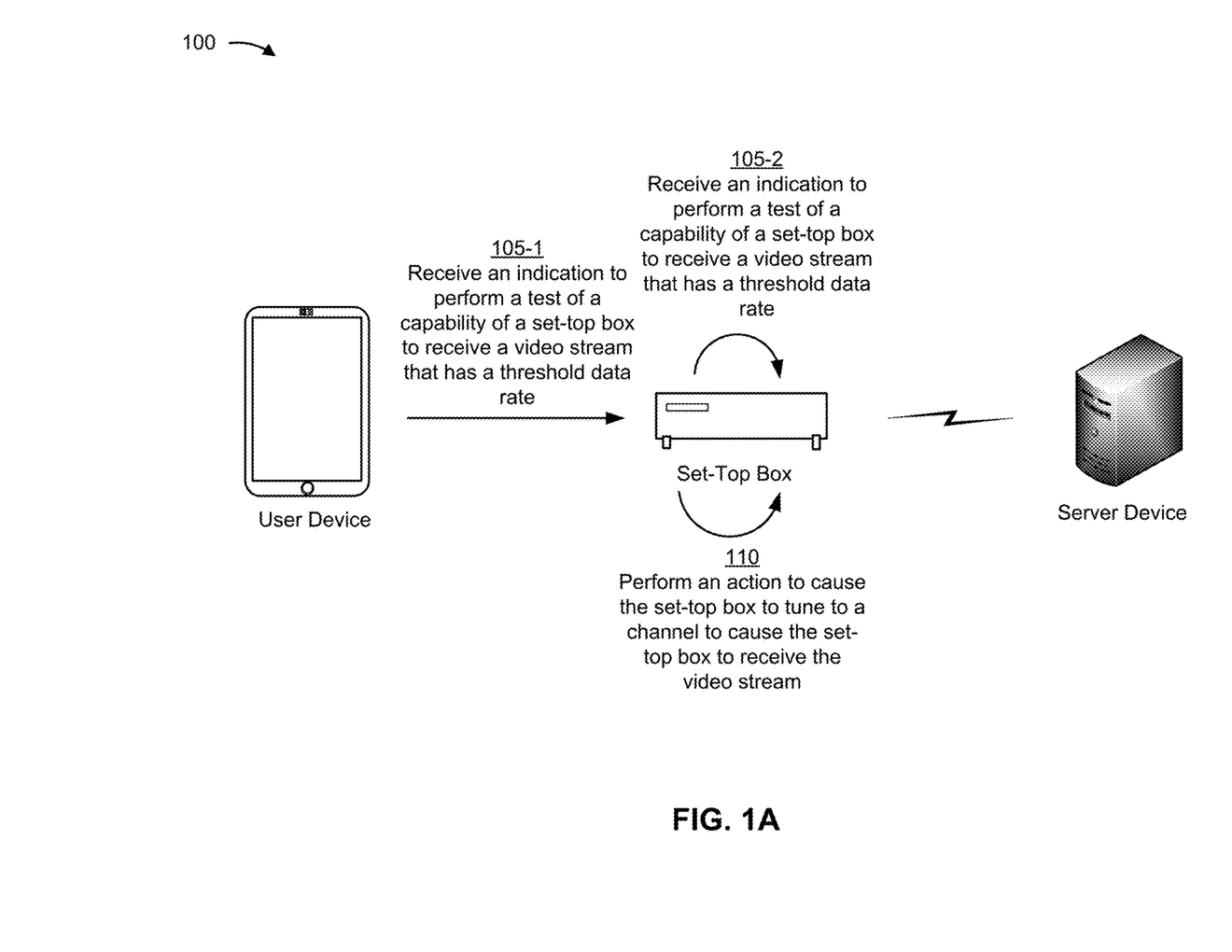
FIGS. 1A-1D are diagrams of an overview of an example implementation described herein.

As shown in FIG. 1A, and as shown by reference numbers 105-1 and 105-2, the set-top box can receive an indication to perform a test of a capability of a set-top box to receive a video stream that has a threshold data rate. For example, as shown by reference number 105-1, the set-top box can receive the indication from a user device (e.g., associated with a technician). As another example, and as shown by reference number 105-2, the set-top box can receive the indication based on being booted up for the first time, based on detecting an error with the operation of the set-top box (e.g., dropped packets, jitter, etc.), after a predetermined threshold amount of time has elapsed, and/or the like. As shown by reference number 110, the set-top box can perform an action to cause the set-top box to tune to a channel to cause the set-top box to receive the video stream. For example, the set-top box can determine that the indication is associated with performing a test of the set-top box and can tune to a particular channel associated with testing the set-top box (e.g., a channel that provides a video stream at a threshold data rate).

Figure 1B:
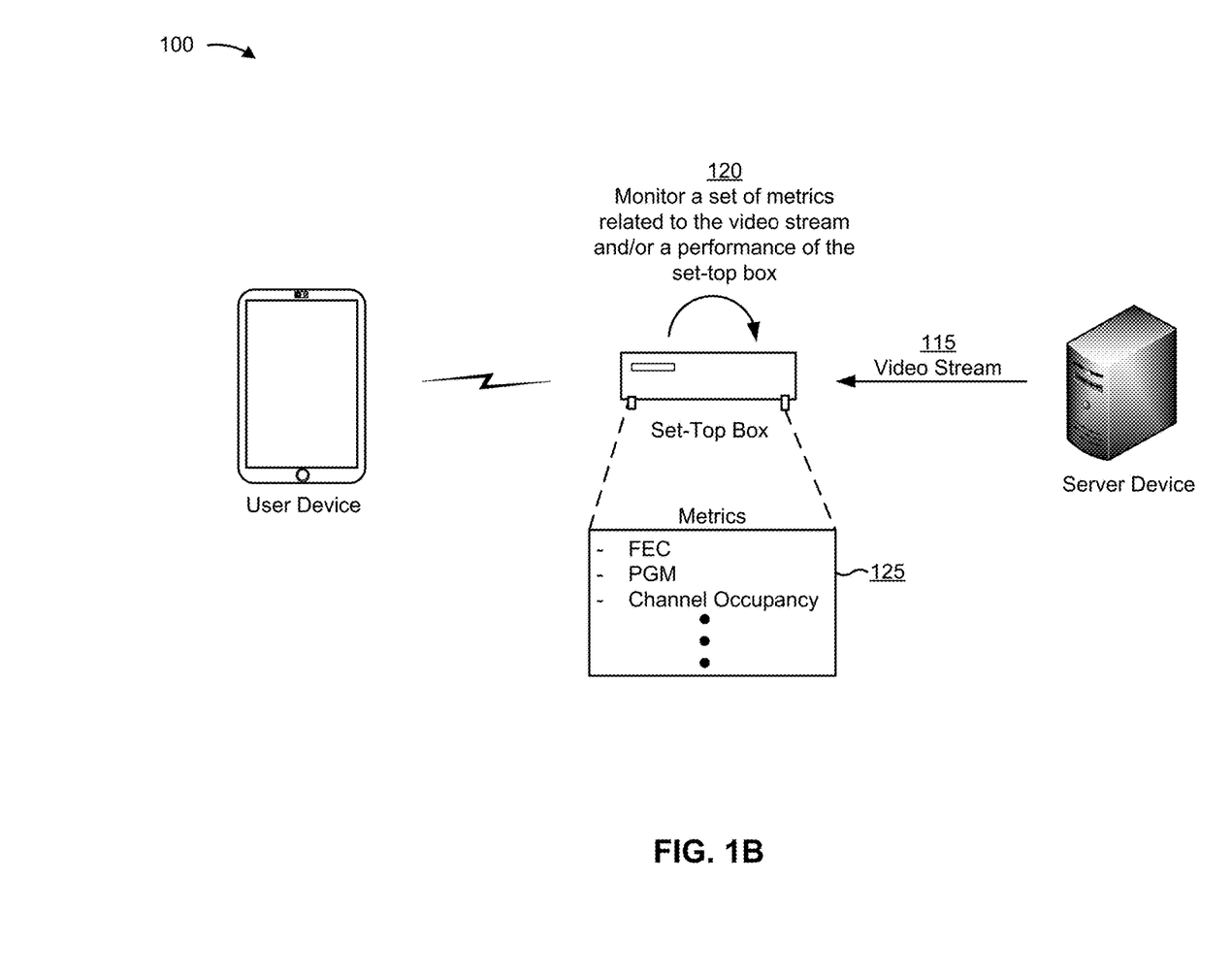

As shown in FIG. 1B, and as shown by reference number 115, the set-top box can receive the video stream from the server device (e.g., after tuning to a channel associated with the video stream). For example, the set-top box can receive the video stream at the threshold data rate. In some cases, the threshold data rate can be configured by a network provider such that the threshold data rate is similar to normal operating conditions of the set-top box, that represents a threshold demand for network resources by other devices at the same premises as the set-top box (e.g., evening hours, weekend hours, etc.), that impacts a performance of the set-top box and/or an access point associated with the set-top box in a manner similar to that which would occur from interference by other devices, and/or the like.

As shown by reference number 120, the set-top box can monitor a set of metrics related to the video stream and/or a performance of the set-top box. For example, the set of metrics can permit the set-top box and/or the user device to determine a manner in which the set-top box is operating, to determine whether the set-top box can operate during normal operating conditions or during times of high demand for network resources, to identify a source of an error when the set-top box is not operating normally or in a particular manner (e.g., identify the set-top box, a location of the set-top box, an access point, etc. as a source of the error), and/or the like. In this way, monitoring metrics can permit the set-top box to determine whether the set-top box is properly configured, whether the set-top box can process a threshold amount of data at a threshold data rate, and/or the like. As shown by reference number 125, the set of metrics can include forward error correction (FEC)-related metrics, pragmatic general multicast (PGM)-related metrics, channel occupancy-related metrics, and/or the like.

Figure 1C:
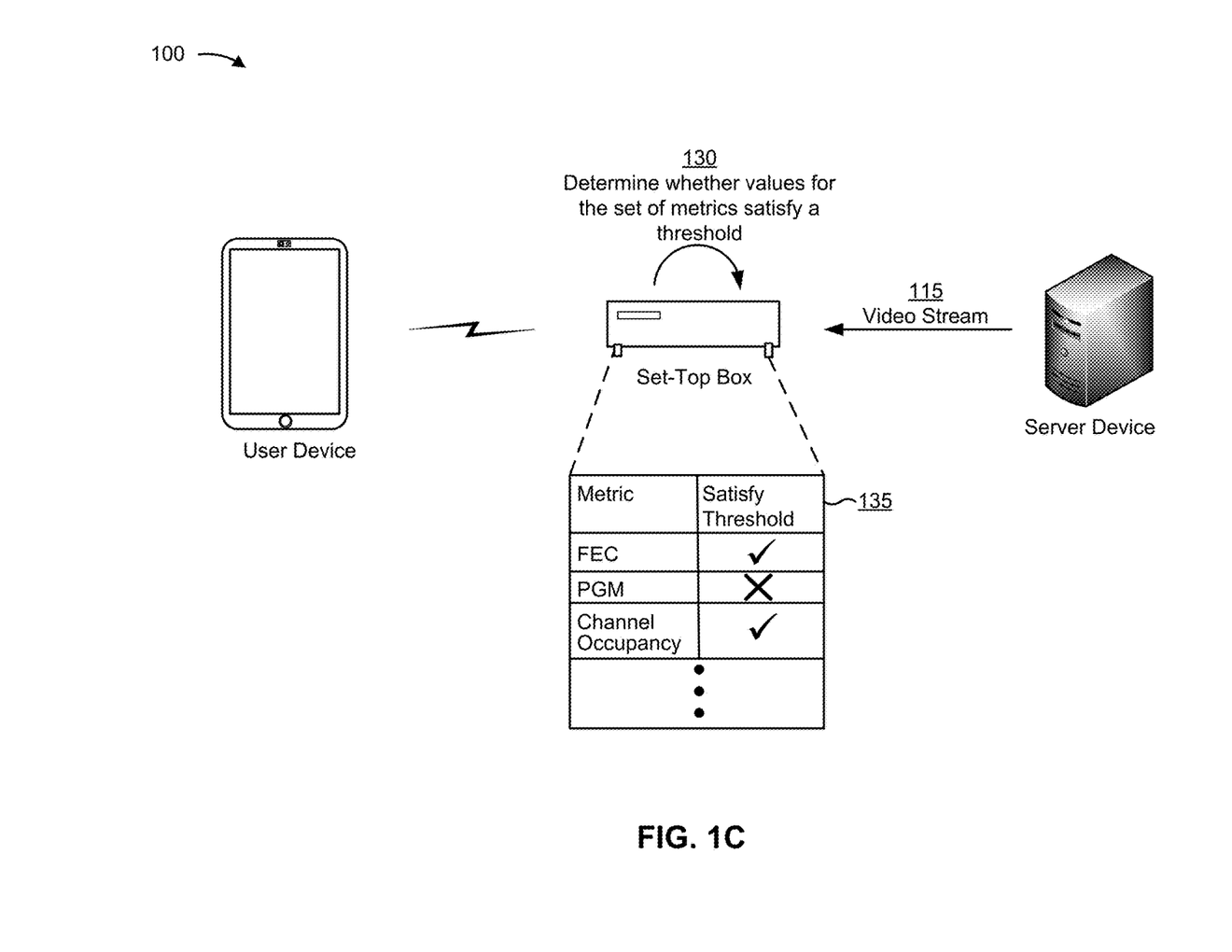

As shown in FIG. 1C, and as shown by reference number 130, the set-top box can determine whether values for the set of metrics satisfy a threshold. For example, satisfaction of a threshold can indicate that the set-top box is operating normally. Conversely, satisfaction of a threshold can indicate that the set-top box is failing to operate normally. As shown by reference number 135, the set-top box can determine which metrics, of the set of metrics, satisfy a threshold. For example, the set-top box can determine that FEC-related metrics and channel occupancy-related metrics satisfy a threshold (e.g., indicating that the set-top box is operating normally). As another example, the set-top box can determine that PGM-related metrics do not satisfy a threshold (e.g., indicating that the set-top box is experiencing an error or failing to operate normally). Determining whether metrics satisfy, or fail to satisfy, a threshold can permit the set-top box to determine whether the set-top box is experiencing an error, to identify a source of the error, and/or the like.

Figure 1D:
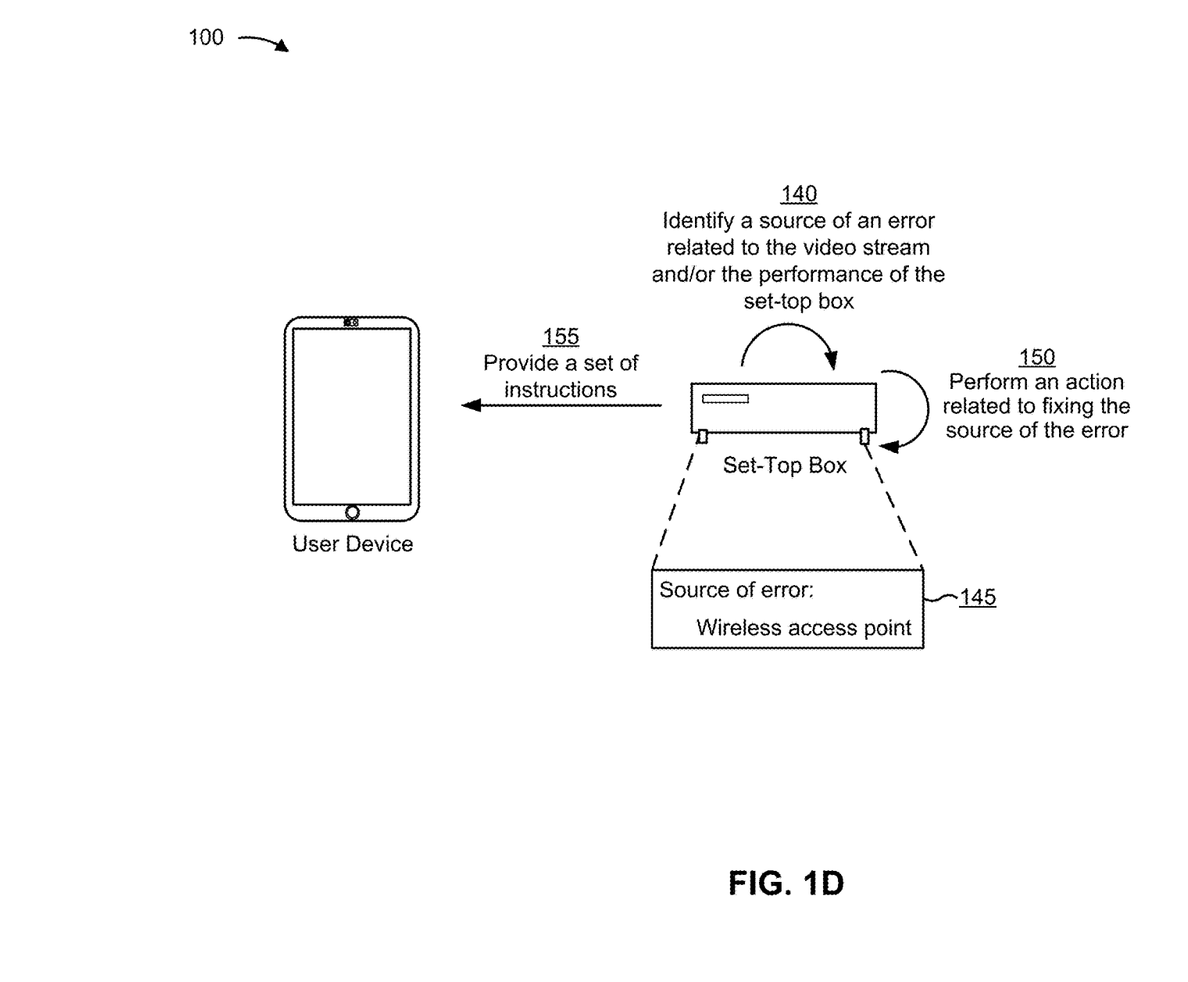

As shown in FIG. 1D, and as shown by reference number 140, the set-top box can identify a source of an error related to the video stream and/or the performance of the set-top box. For example, the set-top box can identify a source of an error based on whether values for the set of metrics satisfy a threshold. Additionally, or alternatively, and as another example, the set-top box can identify a source of an error based on combinations of metrics that are associated with values that satisfy or fail to satisfy thresholds. In some cases, the set-top box can identify the source of the error as the set-top box. Conversely, the set-top box can identify another device as the source of the error, such as an access point associated with the premises at which the set-top box is located. As shown by reference number 145, and as an example of identifying a particular source of an error, the set-top box can identify a wireless access point as the source of the error based on determining that a value for a PGM-related metric fails to satisfy a threshold.

As further shown in FIG. 1D, and as shown by reference number 150, the set-top box can perform an action related to fixing (e.g., addressing) the source of the error. For example, and as shown by reference number 155, the set-top box can provide a set of instructions to the user device related to fixing the error. For example, the set-top box can provide a set of instructions that indicate that the wireless access point should be replaced to fix, or address, the error, should be moved to a different or particular location to fix the error, and/or the like. In some cases, the set-top box can provide information that identifies the values for the set of metrics to the user device to permit the user device to identify a source of the error and/or to determine a manner in which to fix the error.

In this way, a device can self-test to determine a performance of the device in scenarios that are similar to times of high demand for network resources and/or that are similar to normal operating conditions, regardless of whether the device is being tested during a time of low demand for network resources. This improves an installation and/or a test of the device by causing the device to be subjected to conditions that are similar to normal operating conditions or that include a high demand for network resources. In addition, this conserves processing resources of the device that would otherwise be consumed due to a degradation in performance of the device during times of high demand for network resources. Further, this increases an efficiency of installing and/or configuring the device by reducing or eliminating a need for a technician to return to a premises to fix the device due to operational errors caused by high demand for network resources, by ensuring that the device can operate properly under normal operating conditions and/or during times of high demand for network resources at the time of installation, and/or the like.

As indicated above, FIGS. 1A-1D are provided merely as an example. Other examples are possible and can differ from what was described with regard to FIGS. 1A-1D. For example, although FIGS. 1A-1D were described with respect to a set-top box, the implementations described with respect to FIGS. 1A-1D apply equally to other types of devices, such as an access point (e.g., a wireless router), a user device, and/or the like. In addition, although FIGS. 1A-1D were described with respect to tuning a set-top box to a channel to receive a video stream at a threshold data rate, other implementations can include receiving other types of data (e.g., text data, audio data, etc.) at a threshold rate and/or via other forms of communication (e.g., receiving a data stream from a website rather than by tuning to a channel).

Figure 2:
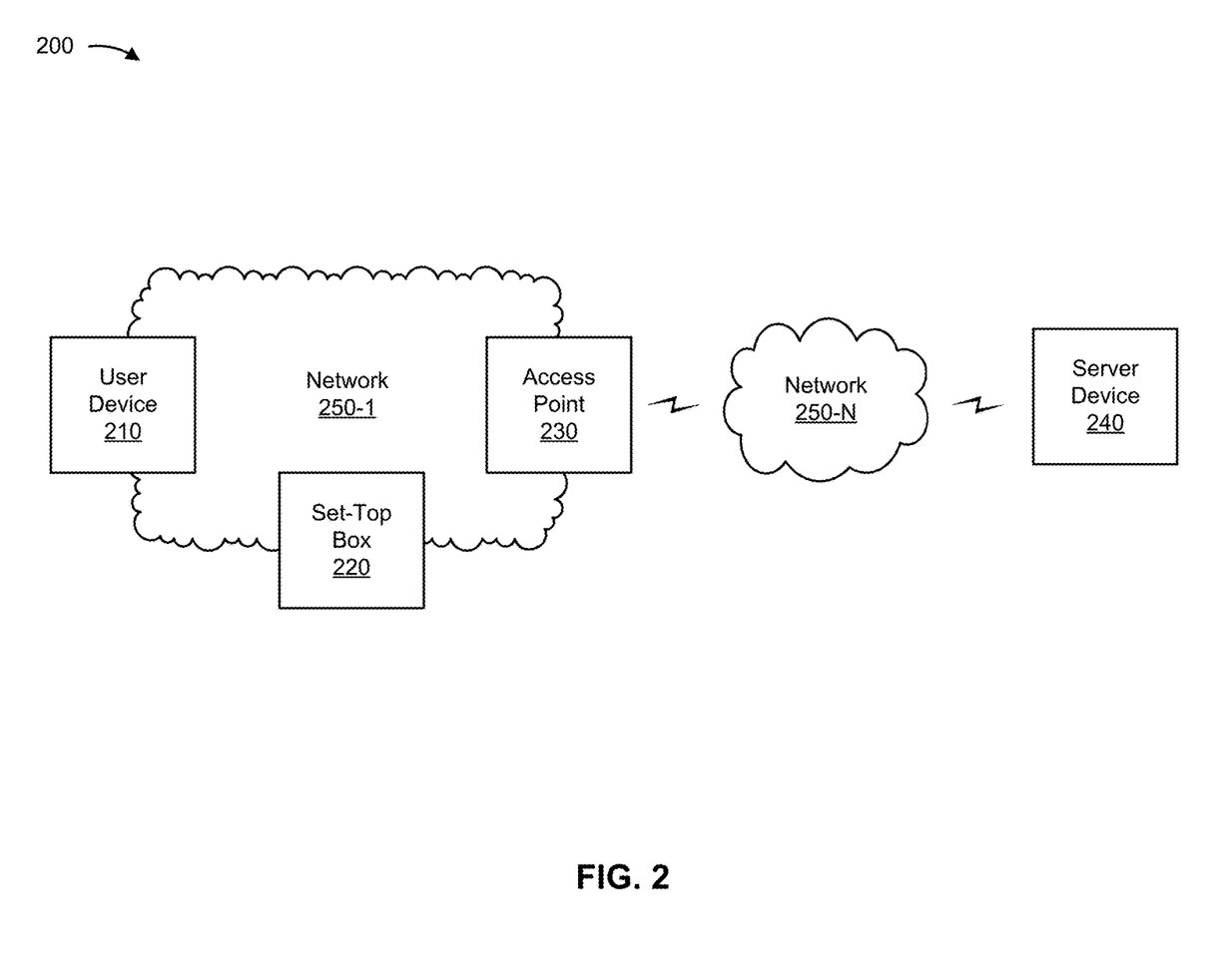
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 210, a set-top box 220, an access point 230, a server device 240, and a set of networks 250-1 through 250-N (N≥1) (collectively referred to herein as "networks 250," and individually as "network 250"). Devices of environment 200 can interconnect via wired connections, wireless connections, or a combination of wired and wireless connections.

User device 210 includes one or more devices capable of receiving, generating, storing, processing, and/or providing information associated with a test of a device. For example, user device 210 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can provide an indication to set-top box 220 to cause set-top box 220 to perform a test of set-top box 220, as described elsewhere herein. Additionally, or alternatively, user device 210 can receive information related to a test of a device (e.g., to be provided for display, to permit user device 210 to analyze the data, etc.), as described elsewhere herein.

Set-top box 220 includes one or more devices capable of receiving, generating, storing, processing, and/or providing information associated with a test of a device. For example, set-top box 220 can include a set-top unit, a cable box, a television tuner, an integrated television and set-top box, a digital cable box, and/or the like. In some implementations, set-top box 220 can receive an indication to perform a test of set-top box 220, or another device, as described elsewhere herein. Additionally, or alternatively, set-top box 220 can perform a test of set-top box 220, or another device, based on receiving an indication to perform the test, as described elsewhere herein.

Access point 230 includes one or more devices capable of communicating (e.g., wirelessly) with local devices connected to network 250-1 (e.g., a local network 250), such as user device 210 and/or set-top box 220, and providing connectivity for local devices, to devices connected to network 250-N (e.g., an external network 250). For example, access point 230 can include a wireless local area network (WLAN) access point, a local area network (LAN) access point, a gateway, a WLAN gateway, a router, a modem, a switch, a hub, a bridge, or a similar type of device. In some implementations, access point 230 can provide data (e.g., a video stream) received from server device 240 to set-top box 220, as described elsewhere herein. Additionally, or alternatively, access point 230 can provide information that identifies values for a set of metrics related to a performance of access point 230 to another device (e.g., to permit analysis of the information), as described elsewhere herein.

Server device 240 includes one or more devices capable of receiving, generating, storing, processing, and/or providing information associated with a test of a device. For example, server device 240 can include a server (e.g., in a data center or a cloud computing environment), a data center (e.g., a multi-server micro data center), a workstation computer, a virtual machine (VM) provided in a cloud computing environment), or a similar type of device. In some implementations, server device 240 can provide data to another device (e.g., set-top box 220 and/or access point 230) to permit the other device to test the other device using the data, as described elsewhere herein. Additionally, or alternatively, server device 240 can store a result of a test of device, such as to improve future tests and/or to permit later analyses, as described elsewhere herein.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, network 250-1 can include a local network 250 (e.g., associated with a premises at which user device 210, set-top box 220, and/or access point 230 are located), as described elsewhere herein. In some implementations, network 250-N can include an external network 250 that provides connectivity from devices associated with network 250-1 to other devices external to network 250-1, such as server device 240, as described elsewhere herein.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
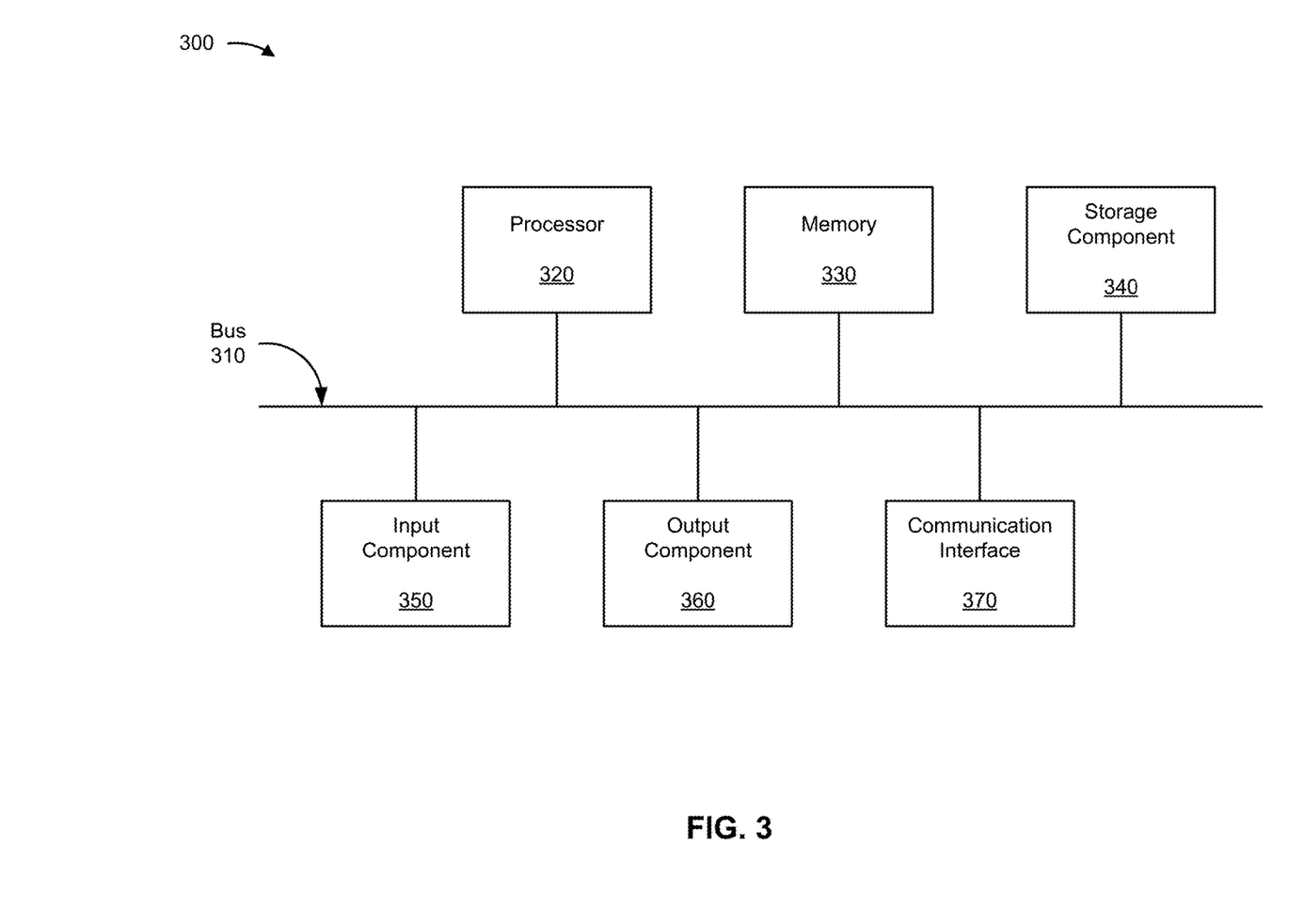
FIG. 3 is a diagram of example components of one or more devices of FIG. 2.

FIG. 3 is a diagram of example components of a device 300. Device 300 can correspond to user device 210, set-top box 220, access point 230, and/or server device 240. In some implementations, user device 210, set-top box 220, access point 230, and/or server device 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operations and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
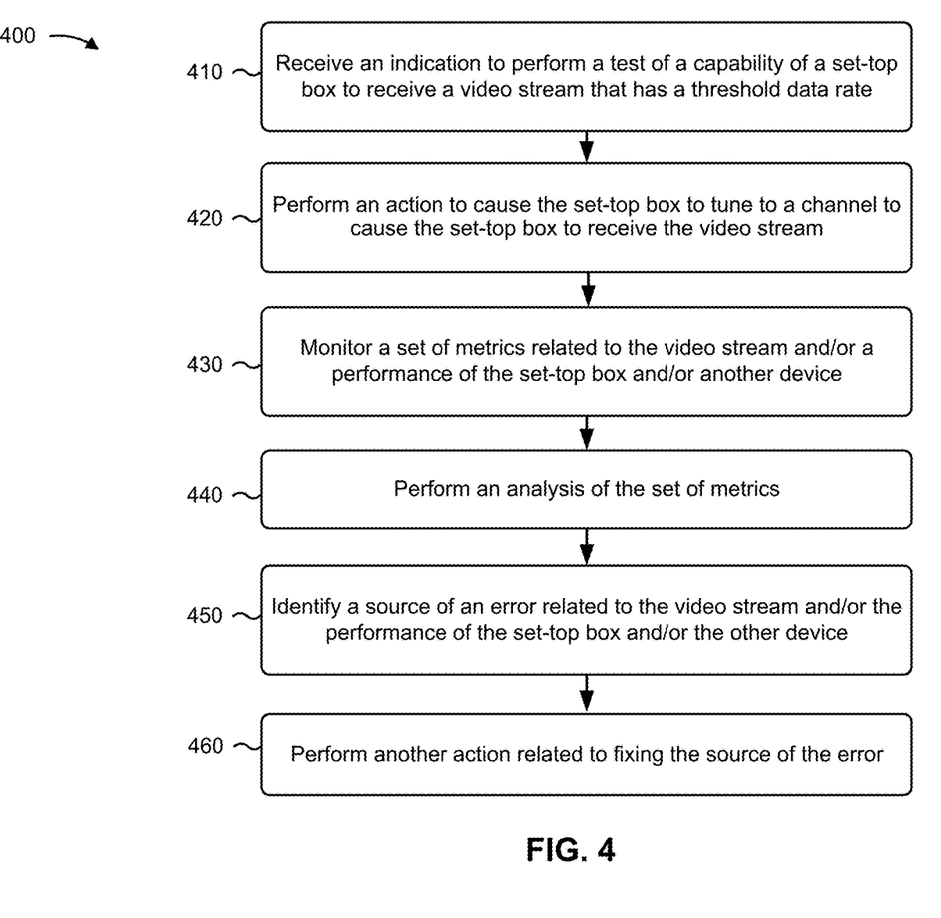
FIG. 4 is a flow chart of an example process for automatic device testing.

FIG. 4 is a flow chart of an example process 400 for automatic device testing. In some implementations, one or more process blocks of FIG. 4 can be performed by set-top box 220. In some implementations, one or more process blocks of FIG. 4 can be performed by another device or a group of devices separate from or including set-top box 220, such as user device 210, access point 230, and/or server device 240.

As shown in FIG. 4, process 400 can include receiving an indication to perform a test of a capability of a set-top box to receive a video stream that has a threshold data rate (block 410). For example, set-top box 220 can receive an indication to perform a test of a capability of set-top box 220 to receive a video stream that has a threshold data rate. In some implementations, set-top box 220 can receive the indication periodically, according to a schedule, based on booting up (e.g., for the first time), based on a user selection of a button associated with set-top box 220 (e.g., a button on a user interface associated with set-top box 220), based on detecting a performance error associated with set-top box 220 (e.g., jitter, lag, etc.), and/or the like.

In some implementations, the test can include a test to determine whether set-top box 220 can process a video stream at a threshold data rate. In some implementations, a test can include a test of multiple devices (e.g., a test of set-top box 220 in relation to other devices connected to set-top box 220, such as access point 230 and/or a set of devices associated with a local network 250). In some implementations, the device being tested can be a device other than set-top box 220, such as user device 210, access point 230, and/or the like.

In some implementations, a data rate can include a speed at which data is transferred via a communications channel (e.g., from server device 240 to another device, such as set-top box 220 and/or access point 230). For example, a data rate can include a bit rate, a throughput, and/or the like. In some implementations, data (e.g., a video stream) can be provided at a threshold data rate to permit or facilitate a test of whether set-top box 220 can process a threshold amount of data (e.g., without experiencing a performance error), to determine a performance of set-top box 220 during times of high demand for network resources by devices on a local network 250 (e.g., a threshold demand for bandwidth), and/or the like.

In some implementations, a video stream can include video data provided to set-top box 220 in a constant or continuous manner (e.g., in a streaming manner). In some implementations, set-top box 220 can receive data other than a video stream. For example, set-top box 220 can receive audio data (e.g., in the form of an audio stream), image data, text data, and/or the like rather than receiving a video stream. In this way, various types of data can be used to test set-top box 220, thereby improving a test of set-top box 220.

In this way, set-top box 220 can receive an indication to perform a test of a capability of set-top box 220 to receive a video stream that has a threshold data rate prior to causing set-top box 220 to tune to a channel associated with performing the test.

As further shown in FIG. 4, process 400 can include performing an action to cause the set-top box to tune to a channel to cause the set-top box to receive the video stream (block 420). For example, set-top box 220 can perform an action to cause set-top box 220 to tune to a channel to cause set-top box 220 to receive the video stream. In some implementations, a channel can be associated with performing a test of set-top box 220. For example, a channel can provide a video stream at a threshold data rate.

In some implementations, a channel can include a communications channel associated with providing data to a device (e.g., set-top box 220). In some implementations, a channel can be used to provide a video stream, or other data, via a coaxial cable, an optical fiber, a satellite transmission, and/or the like.

In some implementations, set-top box 220 can tune set-top box 220 to a particular channel (e.g., a particular channel via which set-top box 220 is to receive the video stream). In some implementations, set-top box 220 can determine the particular channel to which to tune set-top box 220. For example, set-top box 220 can determine the particular channel based on metrics that set-top box 220 is to analyze, information identifying an error identified by a user of set-top box 220 (e.g., a threshold quality of a video stream received via set-top box 220), a type of video stream that set-top box 220 is to receive (e.g., a live video stream, a pre-recorded video stream, a high definition video stream, etc.), and/or the like.

In some implementations, set-top box 220, or another device, can perform an action other than tuning to a channel to test set-top box 220, or the other device. For example, set-top box 220 can navigate to a website, can communicate with another device without tuning to a channel, can tune to a radio station (e.g., to receive an audio stream provided over the Internet), and/or the like. In some implementations, set-top box 220, or another device, can perform a different action based on a type of device being tested, a type of error for which set-top box 220, or the other device, is attempting to identify a source of the error, and/or the like. For example, if the device being tested is access point 230 rather than set-top box 220, set-top box 220, or another device, can perform an action to cause access point 230 to receive a threshold amount of data from server device 240 at a threshold data rate (e.g., rather than specifically tuning to a channel to receive a video stream). In this way, set-top box 220 and/or another device can receive different types of data in different manners to perform a test of set-top box 220, thereby improving a test of set-top box 220.

In this way, set-top box 220 can perform an action to cause set-top box 220 to tune to a channel to cause set-top box 220 to receive the video stream prior to monitoring a set of metrics related to a performance of set-top box 220.

As further shown in FIG. 4, process 400 can include monitoring a set of metrics related to the video stream and/or a performance of the set-top box and/or another device (block 430). For example, set-top box 220 can monitor a set of metrics related to the video stream and/or a performance of set-top box 220 and/or another device (e.g., access point 230).

In some implementations, set-top box 220 can monitor metrics by determining information related to a performance of set-top box 220. For example, set-top box 220 can determine whether set-top box 220 drops packets and/or a quantity of packets that set-top box 220 drops, a quality of the video stream provided for display (e.g., as determined based on input from a user of user device 210, based on detecting a pixelated image, etc.), whether set-top box 220 is experiencing jitter, lag, and/or freezing, and/or the like.

In some implementations, a device other than set-top box 220 can monitor the set of metrics. For example, set-top box 220 can determine information related to a performance of set-top box 220 and can provide the information to another device, such as server device 240 and/or user device 210 to permit server device 240 and/or user device 210 to monitor the set of metrics, perform an analysis of the set of metrics, aggregate metrics from multiple devices (e.g., aggregate metrics from set-top box 220 and access point 230), and/or the like. This can permit a device other than set-top box 220 to analyze data related to metrics from multiple devices to identify a source of an error.

In some implementations, the set of metrics can include FEC-related metrics (e.g., whether set-top box 220 is capable of correcting a threshold quantity of dropped packets, a quantity of redundant packets and/or an amount of redundant data set-top box 220 is capable of providing, etc.), PGM-related metrics (e.g., whether set-top box 220 is experiencing an error caching data, whether set-top box 220 is experiencing an error providing the same data to multiple recipient devices, a quantity of packets and/or an amount of data dropped during multicast of the data, etc.), channel occupancy-related metrics (e.g., a quantity of devices receiving data via the same channel, an amount of bandwidth devices at a premises are consuming, etc.), a signal quality (e.g., a quality of a video stream), bit rate-related metrics, jitter-related metrics, buffering-related metrics, and/or the like. In some implementations, set-top box 220 can record information identifying values for the set of metrics (e.g., to permit an analysis of the set of metrics).

In some implementations, set-top box 220 can monitor the set of metrics in real-time or near real-time. For example, set-top box 220 can monitor the set of metrics as set-top box 220 receives the video stream or other data. This improves an accuracy of identifying a source of an error, thereby improving a test of set-top box 220 and/or conserving processing resources that would otherwise be consumed due to an inaccurate test of set-top box 220.

In this way, set-top box 220 can monitor a set of metrics related to a performance of set-top box 220 and/or another device, and/or related to the video stream, to permit set-top box 220 to determine whether the set of metrics satisfies a threshold.

As further shown in FIG. 4, process 400 can include performing an analysis of the set of metrics (block 440). For example, set-top box 220 can perform an analysis of the set of metrics. In some implementations, set-top box 220 can perform an analysis of the set of metrics in real-time or near real-time (e.g., as set-top box 220 and/or access point 230 receive the video stream, as another device receives other data, etc.).

In some implementations, set-top box 220 can determine whether values for the set of metrics satisfy thresholds (e.g., thresholds associated with proper operation of set-top box 220, thresholds associated with data that does not include errors, etc.). Additionally, or alternatively, set-top box 220 can determine a value for a set of metrics over time (e.g., an average, a weighted average, etc.). Additionally, or alternatively, set-top box 220 can determine whether the set of metrics have a particular value (e.g., a binary value, an expected value, etc.). Additionally, or alternatively, set-top box 220 can determine a trend related to values of the set of metrics (e.g., a trend over time, a trend related to particular types of devices and/or data, etc.).

Additionally, or alternatively, set-top box 220 can determine a pattern related to values of the set of metrics (e.g., a pattern associated with particular types of video streams, particular times of the day or days of the week, etc.). Additionally, or alternatively, set-top box 220 can determine whether values for the set of metrics are similar to historical values for set-top box 220 (e.g., whether the values are within a threshold of historical values, have a similar pattern to historical values, etc.) such as by using machine learning, artificial intelligence, and/or the like. Additionally, or alternatively, set-top box 220 can determine whether values for the set of metrics are similar to other set-top boxes 220 (e.g., are within a threshold amount of values associated with the other set-top boxes 220, have a similar pattern as values associated with the other set-top boxes 220, etc.).

In some implementations, set-top box 220 can determine a score for a set of metrics. For example, set-top box 220 can determine a score for a particular metric based on whether a value for the metric satisfies a threshold, an amount by which the value satisfies a threshold, and/or the like. In some implementations, set-top box 220 can determine a score for a combination of metrics. For example, set-top box 220 can determine a score based on scores determined for various metrics (e.g., an average score, a weighted score, based on which metrics have a threshold value, etc.).

Additionally, or alternatively, and as another example, set-top box 220 can determine a score based on a combination of values for a combination of metrics. Continuing with the previous example, set-top box 220 can determine whether the set of metrics has a particular combination of values (e.g., for particular metrics) and can identify a source of an error based on the particular combination of values. In some implementations, set-top box 220 can determine whether the score satisfies a threshold (e.g., rather than determining whether a value satisfies a threshold).

In some implementations, set-top box 220 can provide information related to the set of metrics to another device (e.g., user device 210 and/or server device 240). For example, set-top box 220 can provide information that identifies a value and/or a score associated with a metric to the other device to permit the other device to determine whether the set of metrics satisfies the threshold.

In this way, set-top box 220 can determine whether the set of metrics satisfies a threshold, to permit set-top box 220 to identify a source of an error.

As further shown in FIG. 4, process 400 can include identifying a source of an error related to the video stream and/or the performance of the set-top box and/or the other device (block 450). For example, set-top box 220 can identify a source of an error related to the video stream and/or the performance of set-top box 220 and/or the other device.

In some implementations, set-top box 220 can identify a source of an error based on whether a set of metrics satisfies a threshold. For example, set-top box 220 can identify a source as set-top box 220, can identify a device other than set-top box 220 as a source, can identify a location of set-top box 220 and/or another device as a source of an error, and/or the like based on whether a set of metrics satisfies a threshold. In some implementations, set-top box 220 can identify a source based on a combination of metrics that satisfy and/or fail to satisfy various thresholds. For example, set-top box 220 can identify a source when a first metric satisfies a first threshold and a second metric satisfies a second threshold.

In some implementations, set-top box 220 can identify a source based on values for a set of metrics having a particular pattern. For example, set-top box 220 can identify a source based on values for a set of metrics having a pattern that is similar to a pattern associated with a known error and/or a known source of an error, a pattern that is different from a historical pattern, and/or the like. Continuing with the previous example, set-top box 220 can identify a source based on a pattern of values using machine learning, artificial intelligence, and/or the like. In some implementations, set-top box 220 can identify a source of an error based on values of a set of metrics over time. For example, set-top box 220 can identify a source of an error based on a metric having a first value at a first time and a second value at a second time.

In some implementations, set-top box 220 can receive information from another device that identifies a source of an error. For example, set-top box 220 can receive information from user device 210 and/or server device 240 that identifies a source of an error (e.g., after user device 210 and/or server device 240 performs an analysis of the set of metrics). This conserves processing resources of set-top box 220 by reducing or eliminating a need for set-top box 220 to identify a source of an error.

In this way, set-top box 220 can identify a source of an error related to the performance of set-top box 220 and/or the other device, and/or related to the video stream to permit set-top box 220 to perform an action related to fixing the source of the error.

As further shown in FIG. 4, process 400 can include performing another action related to fixing the source of the error (block 460). For example, set-top box 220 can perform another action related to fixing the source of the error.

In some implementations, set-top box 220 can generate a recommendation to move set-top box 220 and/or access point 230 to a different location of the premises, to reboot set-top box 220 and/or access point 230, to replace set-top box 220 and/or access point 230, to update software related to set-top box 220 and/or access point 230, and/or the like.

In some implementations, set-top box 220 can cause set-top box 220 and/or access point 230 to reboot. Additionally, or alternatively, set-top box 220 can cause set-top box 220 and/or access point 230 to update software related to set-top box 220 and/or access point 230. Additionally, or alternatively, set-top box 220 can generate a report (e.g., that identifies a source of an error) and can provide the report for display (e.g., output the report), such as via user device 210. Additionally, or alternatively, set-top box 220 can send a message (e.g., to user device 210) that includes information identifying a source of an error and/or a generated recommendation.

In some implementations, another device can perform the action related to fixing the source of the error (e.g., rather than set-top box 220 performing the action). For example, user device 210 can perform the action related to fixing the source of the error, server device 240 can perform the action related to fixing the source of the error, and/or the like. This conserves processing resources of set-top box 220 by reducing or eliminating a need for set-top box 220 to perform the action.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Figure 5A:
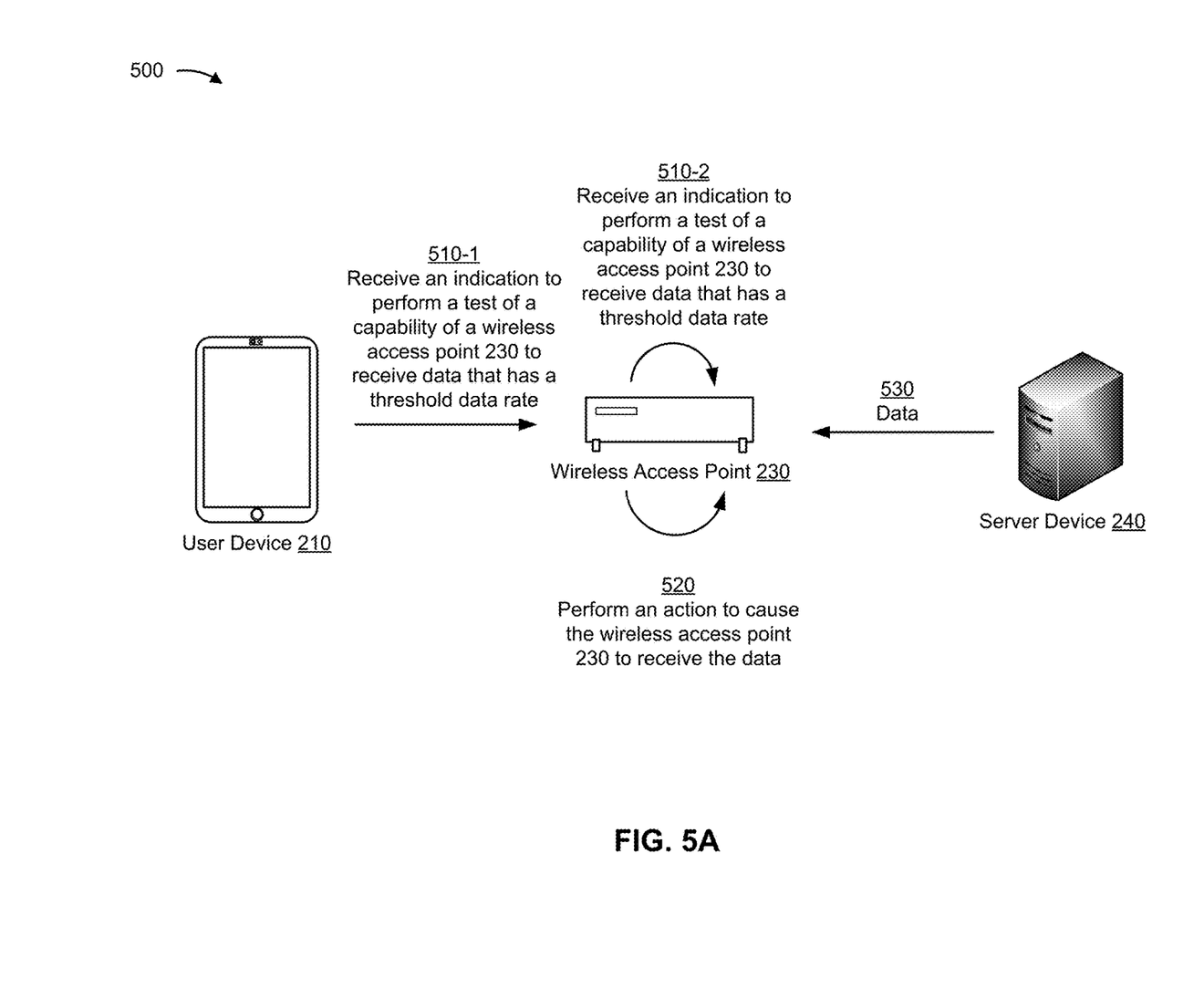
FIGS. 5A-5C are diagrams of an example implementation relating to the example process shown in FIG. 4.
Figure 5B:
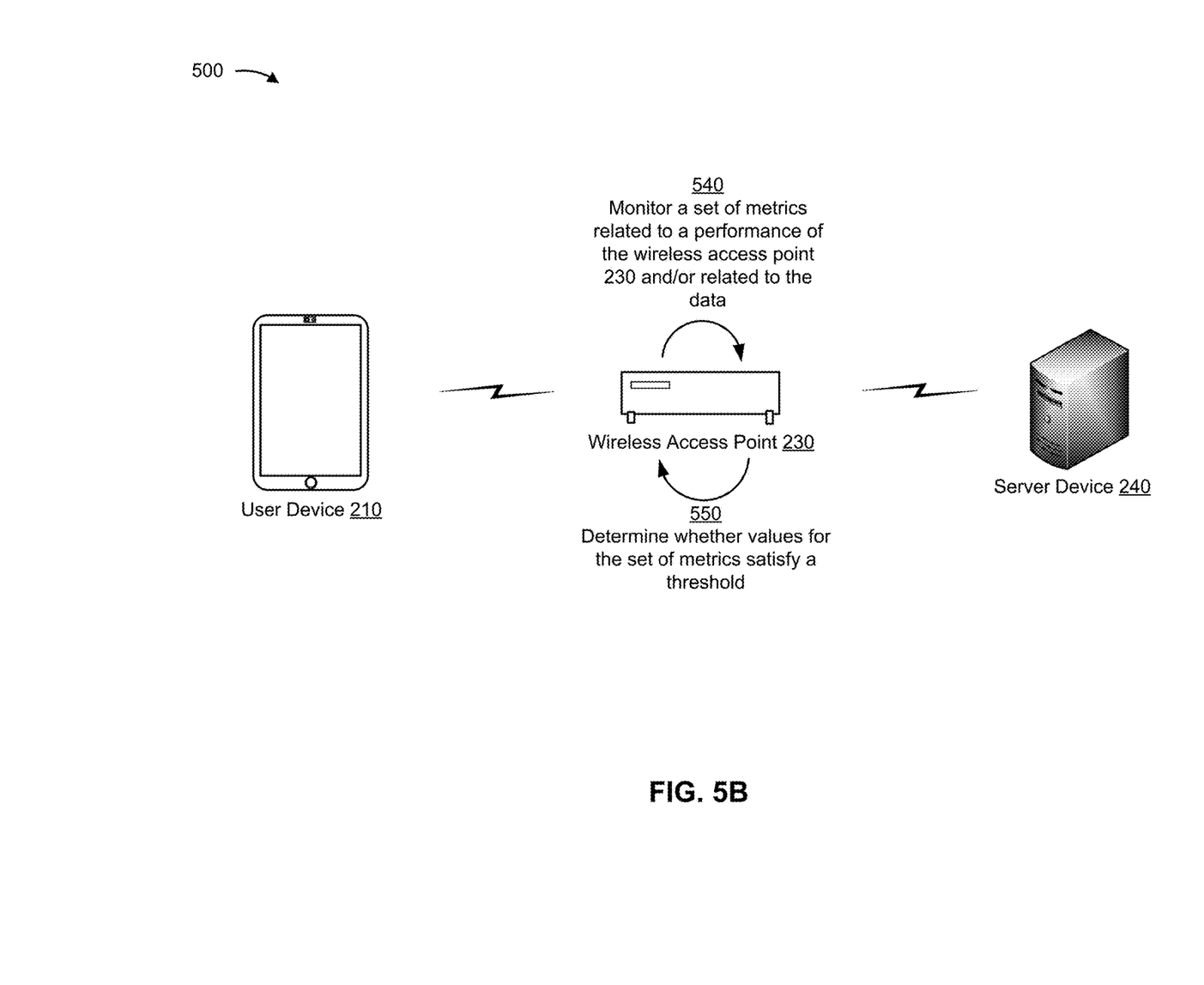
Figure 5C:
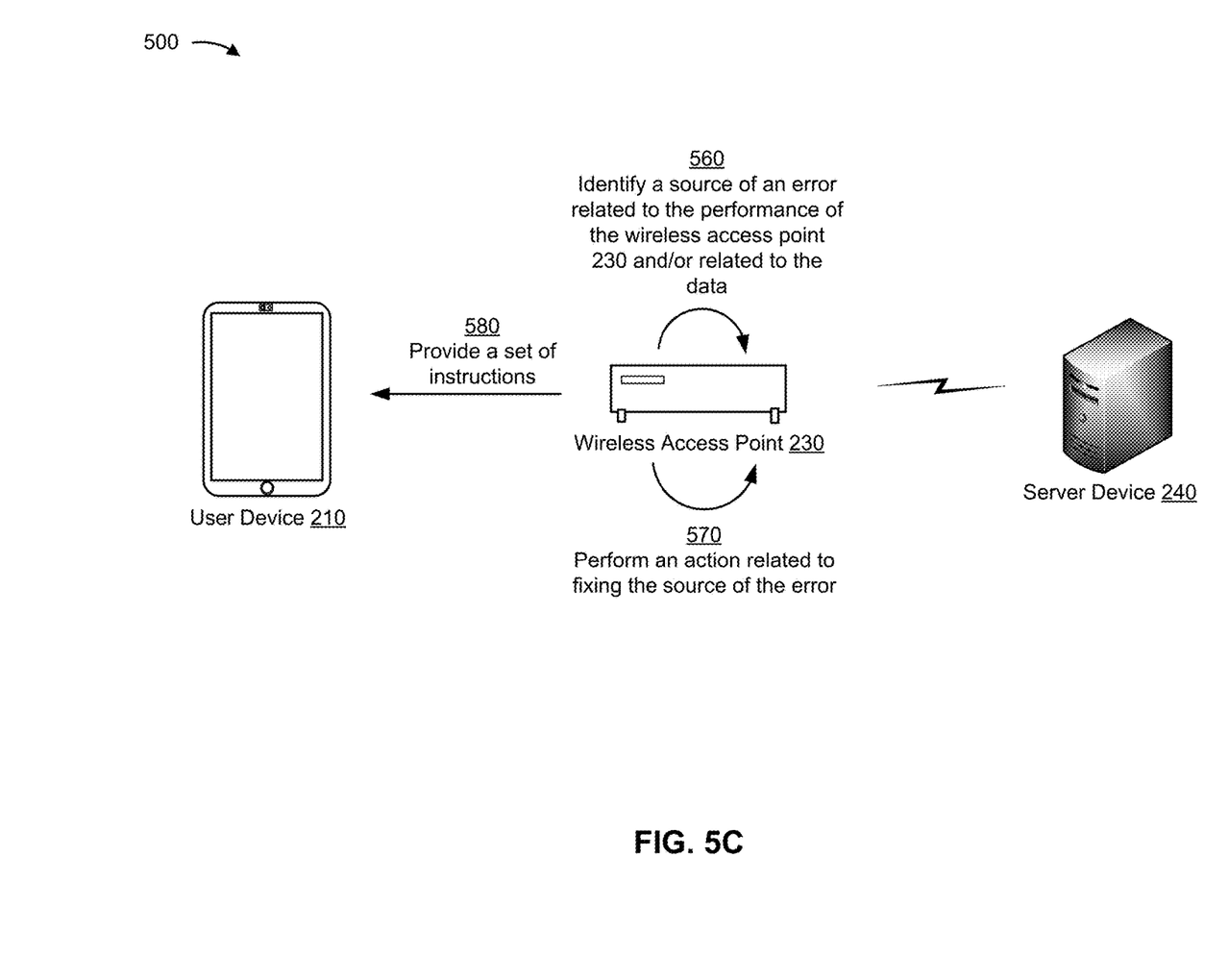

FIGS. 5A-5C are diagrams of an example implementation 500 relating to example process 400 shown in FIG. 4. FIGS. 5A-5C show an example of automatic device testing. For illustration, implementation 500 includes user device 210, a wireless access point 230, and server device 240. FIGS. 5A-5C show an example of testing a wireless access point 230 rather than set-top box 220.

As shown in FIG. 5A, and by reference numbers 510-1 and 510-2, a wireless access point 230 can receive an indication to perform a test of a capability of the wireless access point 230 to receive data that has a threshold data rate. For example, and as shown by reference number 510-1, the wireless access point 230 can receive the indication from user device 210 (e.g., based on input from a user of user device 210). Additionally, or alternatively, and as shown by reference number 510-2, the wireless access point 230 can receive the indication by booting up, detecting an error related to the data, and/or the like, as another example.

As shown by reference number 520, the wireless access point 230 can perform an action to cause the wireless access point 230 to receive the data. For example, the wireless access point 230 can provide a request from set-top box 220 (not shown) to server device 240 for a video stream associated with a particular channel, can provide a request to server device 240 for a data stream associated with a particular website, and/or the like. As shown by reference number 530, the wireless access point 230 can receive the data from server device 240.

As shown in FIG. 5B, and by reference number 540, the wireless access point 230 can monitor a set of metrics related to a performance of the wireless access point 230 and/or related to the data. For example, the wireless access point 230 can monitor the set of metrics in a manner similar to that described above with respect to FIG. 4. As shown by reference number 550, the wireless access point 230 can determine whether values for the set of metrics satisfy a threshold. For example, the wireless access point 230 can determine whether values for the set of metrics satisfy a threshold in a manner similar to that described above with respect to FIG. 4.

As shown in FIG. 5C, and by reference number 560, the wireless access point 230 can identify a source of an error related to the performance of the wireless access point 230 and/or related to the data. For example, the wireless access point 230 can identify the wireless access point 230, or another device, as a source of an error in a manner similar to that described above with respect to FIG. 4. As shown by reference number 570, the wireless access point 230 can perform an action related to fixing the source of the error. For example, the wireless access point 230 can generate a report, can generate a recommendation, can cause the wireless access point 230 and/or another device to boot up or power down, and/or the like in a manner similar to that described above with respect to FIG. 4.

As shown by reference number 580, the wireless access point 230 can provide a set of instructions to user device 210 related to fixing the error. For example, the set of instructions can include rebooting the wireless access point 230, updating software for the wireless access point 230, moving the wireless access point 230 to a different location, and/or the like.

In this way, the wireless access point 230 can identify and/or fix a source of an error related to receiving data at a threshold data rate.

As indicated above, FIGS. 5A-5C are provided merely as an example. Other examples are possible and can differ from what was described with regard to FIGS. 5A-5C.

Some implementations, described herein, provide a device that is capable of performing a self-test by tuning to a channel to cause the device to use a threshold amount of network resources. In this way, the device can self-test to determine a performance of the device in scenarios that are similar to times of high demand for network resources and/or that are similar to normal operating conditions (e.g., particular operating conditions), regardless of whether the device is being tested during a time of low demand for network resources. This improves an installation and/or a test of the device by causing the device to be subjected to conditions that are similar to normal operating conditions or that include a high demand for network resources. In addition, this conserves processing resources of the device that would otherwise be consumed due to a degradation in performance of the device during times of high demand for network resources. Further, this increases an efficiency of installing and/or configuring the device by reducing or eliminating a need for a technician to return to a premises to fix the device due to operational errors caused by high demand for network resources, by ensuring that the device can operate properly under normal operating conditions and/or during times of high demand for network resources at the time of installation, and/or the like.

Although implementations were described herein with respect to a particular device, such as set-top box 220 and/or access point 230, the implementations apply equally to other types of devices, such as user device 210 and/or server device 240 and are not limited to the particular type of device with which the implementations were described.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   one or more memories; and
   one or more processors, communicatively coupled to the one or more memories, to:
      receive an indication to perform a test of a capability of the network device to determine whether the network device can process data during times of a threshold demand for network resources by devices on a network;
      perform, based on receiving the indication, an action to cause the network device to receive the data from a source of the data at a threshold data rate associated with the threshold demand for the network resources;
      monitor, based on causing the network device to receive the data from the source of the data at the threshold data rate, a set of metrics related to the data or a performance of the network device during the times of the threshold demand for the network resources,
         the set of metrics including at least one of:
            a forward error correction (FEC)-related metric,
            a pragmatic general multicast (PGM)-related metric, or a channel occupancy-related metric;
      perform an analysis of the set of metrics after monitoring the set of metrics;
      identify a source of an error based on a result of performing the analysis of the set of metrics,
         the source of the error being related to the data or the performance of the network device; and
      perform another action related to fixing the source of the error.

2. The network device of claim 1, where the receiving the indication is based on input from a user of another device.

3. The network device of claim 1, where the performing the action is to cause the network device to tune to a channel to cause the network device to receive the data.

4. The network device of claim 1, where the one or more processors are further to:
   determine whether values for the set of metrics satisfy thresholds; and
   where the identifying the source of the error is based on whether the values satisfy the thresholds.

5. The network device of claim 1, where the one or more processors are further to:
   determine a score related to the set of metrics after performing the analysis of the set of metrics; and
   where the identifying the source of the error is based on the score related to the set of metrics.

6. The network device of claim 1, where the one or more processors are further to:
  determine that values for the set of metrics have a particular pattern; and
  where the identifying the source of the error is based on the values having the particular pattern.

7. The network device of claim 1, where the performing the other action includes generating a recommendation to move the network device or another device to a particular location to fix the error.

8. A non-transitory computer-readable medium storing instructions, the instructions comprising:
  one or more instructions that, when executed by one or more processors, cause the one or more processors to:
    receive an indication to perform a test of a capability of a network device to determine whether the network device can process data during times of a threshold demand for network resources by devices on a network;
    perform, based on receiving the indication, an action to cause the network device to receive the data from a source of the data at a threshold data rate associated with the threshold demand for the network resources;
    monitor, based on causing the network device to receive the data from the source of the data at the threshold data rate, a set of metrics related to the data or a performance of the network device during the times of the threshold demand for the network resources,
      the set of metrics including at least one of:
        a forward error correction (FEC)-related metric,
        a pragmatic general multicast (PGM)-related metric, or
        a channel occupancy-related metric;
    perform an analysis of the set of metrics after monitoring the set of metrics;
    identify a source of an error based on a result of performing the analysis of the set of metrics,
      the source of the error being related to the data or the performance of the network device; and
    perform another action related to fixing the source of the error.

9. The non-transitory computer-readable medium of claim 8, where the one or more instructions, when executed by the one or more processors, further cause the one or more processors to:
  detect the error by monitoring at least one of:
    the data, or
    the performance of the network device; and
  where the one or more instructions, that cause the one or more processors to receive the indication, cause the one or more processors to:
    receive the indication based on detecting the error.

10. The non-transitory computer-readable medium of claim 8, where the threshold demand for network resources is based on particular operating conditions related to the network device.

11. The non-transitory computer-readable medium of claim 8, where the one or more instructions, that cause the one or more processors to perform the action, cause the one or more processors to:
  communicate with another device to receive the data from a website.

12. The non-transitory computer-readable medium of claim 8, where the one or more instructions, when executed by the one or more processors, further cause the one or more processors to:
  determine whether values for the set of metrics are similar to historical values for the set of metrics; and
  where the one or more instructions, that cause the one or more processors to identify the source of the error, cause the one or more processors to:
    identify the source of the error based on whether the values for the set of metrics are similar to the historical values for the set of metrics.

13. The non-transitory computer-readable medium of claim 8, where the one or more instructions, when executed by the one or more processors, further cause the one or more processors to:
  determine a score for the set of metrics based on values for the set of metrics; and
  where the one or more instructions, that cause the one or more processors to identify the source of the error, cause the one or more processors to:
    identify the source of the error based on the score for the set of metrics.

14. The non-transitory computer-readable medium of claim 8, where the one or more instructions, that cause the one or more processors to perform the other action, cause the one or more processors to:
  generate a report that identifies the source of the error; and
  output the report for display after generating the report.

15. A method, comprising:
  receiving, by a network device, an indication to perform a test of a capability of the network device to determine whether the network device can process data during times of a threshold demand for network resources by devices on a network;
  performing, by the network device and based on receiving the indication, an action to cause the network device to receive the data from a source of the data at a threshold data rate associated with the threshold demand for the network resources;
  monitoring, by the network device and based on causing the network device to receive the data from the source of the data at the threshold data rate, a set of metrics related to the data or a performance of the network device during the times of the threshold demand for the network resources,
    the set of metrics including at least one of:
      a forward error correction (FEC)-related metric,
      a pragmatic general multicast (PGM)-related metric, or
      a channel occupancy-related metric;
  performing, by the network device, an analysis of the set of metrics after monitoring the set of metrics;
  identifying, by the network device, a source of an error based on a result of performing the analysis of the set of metrics,
    the source of the error being related to the data or the performance of the network device; and
  performing, by the network device, another action related to fixing the source of the error.

16. The method of claim 15, where performing the action comprises:
  causing the network device to tune to a channel to receive the data.

17. The method of claim 15, where performing the analysis comprises:
  determining values for the set of metrics over time; and
  where identifying the source of the error comprises:
    identifying the source of the error after determining the values for the set of metrics over time.

18. The method of claim 15, where performing the analysis comprises:
   determining whether metrics, of the set of metrics, have a particular combination of values; and
   where identifying the source of the error comprises:
      identifying the source of the error based on the particular combination of values.

19. The method of claim 15, where the network device includes:
   a set-top box, or
   a wireless access point.

20. The method of claim 15, where performing the other action comprises:
   causing the network device or another device to reboot to fix the error.

* * * * *